United States Patent Office 2,744,124
Patented May 1, 1956

2,744,124

PROCESS FOR PREPARING FATTY ACID PARTIAL ESTERS OF POLYHYDRIC ALCOHOLS

William Godfrey Alsop, Summit, N. J., assignor to Colgate-Palmolive Company, Jersey City, N. J., a corporation of Delaware No Drawing. Application November 28, 1952, Serial No. 323,125

13 Claims. (Cl. 260—410.7)

This invention relates to an improved process for preparing fatty acid partial esters, and especially monoesters, of polyhydric alcohols. The invention relates more particularly to an improved process for preparing fatty acid monoglycerides from fats and fatty oils.

It is of course well known that monoglycerides of fatty acids can be prepared by reacting a suitable triglyceride of a fatty acid, e. g., any of the fats or fatty oils, with glycerine in the presence of a suitable alcoholysis catalyst, and that other fatty acid monoesters of polyhydric alcohols may be similarly prepared. Numerous prior art proposals made in connection with reactions of this kind have concerned themselves with batch processes, with continuous processes, with variations in the ratios of reactants, with variations in other conditions of reaction such as temperatures, catalysts, solvents, pressures, etc., etc., all with a view to increasing the yield and/or quality of desired monoester products.

It is an object of the present invention to provide an improved process for producing partial esters of fatty acids with polyhydric alcohols, and in particular an improved process for producing monoglycerides by reaction of glycerine with suitable fats and oils under certain well-defined conditions. A further object is to provide a continuous process for carrying out such reactions while enhancing the yield and/or improving the quality of the product obtained.

According to the present invention, excellent yields of the desired product may be obtained, in relatively short reaction times, by passing a very intimate mixture of proper proportions of a suitable polyhydric alcohol and a suitable fatty acid ester of said polyhydric alcohol having more than one fatty acid radical per molecule, and while in admixture with a suitable alcoholysis catalyst, through a reaction zone at such a rate that the reaction goes substantially to equilibrium, thereafter withdrawing the reaction mixture from the reaction zone and then rapidly cooling the reaction product. More specifically, and with particular reference to the production of monoglycerides from fats and oils, the invention includes the features of continuously passing a mixture of glycerine containing an alcoholysis catalyst and a suitable fat or oil in the proper ratios through a suitable preheating zone and thence into a reaction zone provided with efficient and intensive agitating means to produce an intimate mixture of the ingredients, maintaining the intimate mixture at an elevated temperature in the reaction zone for a period of time sufficient for the reaction to go substantially to completion, which in one form of apparatus required about 3 to 7 minutes, and preferably about 5 to 7 minutes, and thereafter continuously withdrawing the reaction mixture from the reaction zone and passing it immediately into a cooling zone in which it is rapidly cooled.

It has been discovered that when operating under the aforesaid conditions the yields are somewhat higher and the color of the monoester product is considerably better than in batch processes using the same ratios of ingredients and catalyst.

The fats and oils treated by the process of the present invention may be any of the well known fatty acid esters, such as the fats and fatty oils that are employed in the soap-making industry, or any other fatty acid esters, whether of a polyhydric alcohol such as glycerol or of a dihydric alcohol such as ethylene glycol or propylene glycol. It is preferred to employ esters of fatty acids having about 8 to 26 and preferably about 12 to 20 carbon atoms per molecule of fatty acid. Such fatty materials are of vegetable and animal origin and include cottonseed oil, olive oil, tung oil, corn oil, soyabean oil, palm oil, coconut oil, whale oil, fish oil, palm kernel oil, Babassu oil, as well as modified oils such as hydrogenated tallow, bodied linseed oil, etc., etc. They may or may not be pretreated such as by hydrogenation, refining, bleaching, etc., as desired. Fatty diglycerides may also be used as charge material. All such charge materials may be defined as fatty esters of polyhydric alcohols having at least two esterified hydroxy groups per molecule and will sometimes be referred to as polyesters of polyhydric alcohols. In the claims a reference to fat is to be construed as including fatty oils.

Among the polyhydric alcohols that may be employed in preparing monoesters according to the present invention are the aliphatic polyhydroxy alcohols having from 2 to 6 carbon atoms per molecule, and preferably the di- and trihydroxy short chain polyhydric alcohols. Among such compounds are the glycols such as ethylene glycol, diethylene glycol, propylene glycol, dipropylene glycol, polyhydric alcohols having 3 or more hydroxy groups such as glycerol, butanetriols, di-, tri- and pentaglycerol, etc., etc. Generally speaking, however, propylene glycol and glycerol are to be regarded as the preferred polyhydroxy alcohols of which monoesters are to be prepared in the manner described more fully hereinafter.

While the molecular ratio of polyhydric alcohol to fat or fatty oil may be varied over a considerable range, such as from about 2 to 14, very desirable results are obtained when the ratio of polyhydric alcohol, such as glycerine, to fat or fatty oil is varied from about 2 to 10. As the data set forth hereinafter will illustrate, whatever ratio is chosen it will be found that at least as good yields of monoglyceride are obtained at the lower glycerine-to-fat ratios and that much higher yields of monoglyceride are obtained at the higher glycerine-to-fat ratios, as compared with the results obtained in batch processing.

The temperature of reaction may vary over a rather wide range from about 200° to 350° C., depending upon the nature of the particular reactants and the nature of the product desired. When preparing monoglycerides, a preferred range of temperatures is about 240° to 270° C. and preferably about 250° C. When preparing monoesters of propylene glycol, somewhat lower temperatures are preferred, such as about 200° to 230° C., and preferably about 210° C.

The monoester-forming reaction may be carried out in the presence of either an alkaline or an acid alcoholysis catalyst, such as an alkali metal hydroxide or sulfuric acid or other mineral acid, respectively. Generally speaking, however, it is preferred to employ an alkaline catalyst such as sodium hydroxide or potassium hydroxide, the catalyst being employed in the ratio of about 0.05 to 2.0% by weight of the fatty material charged to the reaction zone. The catalyst may be introduced directly into the mixture of reactants in the reaction zone, or it may be first separately incorporated in one of the reactants. A suitable manner of introducing the catalyst is to dissolve it in the glycerine provided the glycerine is not first preheated prior to admixture thereof with the fatty material, since in such case some undesirable conversion of the glycerine to di- and/or higher poly-glycerols may take place. In any case, when preheating is resorted to it should be very rapid so as to avoid exposing the reactant or reactants to elevated temperatures for much longer than about 1 minute prior to introduction into the reaction vessel proper.

The reaction is caused to take place in a reaction vessel equipped with means for bringing about very efficient agitation of the reaction mixture, and hence very intimate contact between the reactant phases. The reaction mixture is passed continuously through the reaction zone, preferably from top to bottom of an elongated vertically disposed reaction zone fitted with a series of baffles and stirrers (paddles or propellers) such that very intimate contact between the reactant phases is initiated and maintained at all times while the reaction mixture pursues a tortuous path through said reaction zone.

The reaction vessel is preferably fitted with a jacket through which circulates Dowtherm or other suitable heat exchange liquid, or alternatively the reaction vessel may be equipped with suitable electric heating elements such as Calrod heaters in order to maintain the desired temperature of the reaction mixture within the reaction zone.

Furthermore, the reaction vessel is of such a size relative to the feed rate of the ingredients that a sufficient hold up or reaction time is provided for the reaction to go substantially to equilibrium. Where the reactants are not miscible with each other the time of reaction, i. e., the time required to reach substantial equilibrium, is a function of the intimacy of the dispersion of one reactant in the other and to some extent on the ratio of the polyhydric alcohol to the ester, but in apparatus of the type mentioned above a reaction zone having a capacity from 3 to 7 times, and preferably from about 5 to 7 times, the combined pumping rates of the glycerine and fat in pounds per minute, has given satisfactory results. Stated differently, the process of the present invention is operated in such fashion that the hold-up time in the reaction zone is at most only a few minutes, preferably about 7 minutes or less.

It is emphasized that the principal requirements that must be observed in practicing the present invention are that very intimate contact between the two reactant phases shall be maintained throughout the entire reaction zone, and that the intimate mixture shall remains in the reaction zone only for the relatively small hold-up time required to reach substantial equilibrium, viz., about 7 minutes or less.

After leaving the reaction zone, provision is made for immediately passing the reaction product containing the monoglyceride or other monoester into an efficient cooling zone in which the temperature is rapidly reduced such as to below 150° C.

The reaction mixture is then treated in such manner as to inhibit or destroy the catalyst such as by neutralization of the reaction mixture to a pH of about 5 to 8, and preferably to about 6 to 7. The excess unreacted polyhydric alcohol may then be removed by distillation, after which the monoglycerides or other monoesters are separated by distillation under reduced pressure, in accordance with conventional separatory practice known per se in the art.

In order to better illustrate the present invention, there are shown below in tabular form the results of preparing monoglycerides in accordance with the present process as contrasted with the results obtained by batch processing of the same fats under otherwise similar conditions of temperature, molecular ratios of glycerine-to-fat, etc., etc.:

| Fat | Molecular Ratio, Glyc./Fat | Yield of Monoglyceride, percent | Method | Reaction Time, Minutes |
| --- | --- | --- | --- | --- |
| Lard | 2:1 | 45 | Batch | 30 |
| Do | 2:1 | 46.7 | Continuous | 5 |
| Do | 4.9:1 | 56.6 | do | 6 |
| Partially Hydrogenated Vegetable Oil | 2:1 | 46.2 | Batch | 30 |
| Do | 2:1 | 54.0 | Continuous | 5 |
| Hydrogenated Tallow | 14:1 | 53 | Batch | 90 |
| Do | 8:1 | 64 | Continuous | 7 |

In each of the continuous runs in which the results are set forth numerically in the foregoing tabulation, the fat from which the monoglyceride was to be produced was pumped with glycerine containing 0.47% by weight of NaOH as alcoholysis catalyst through a heater that raised the temperature of the mixture to approximately 250° C. in one minute, and thence into the top of a vertical reaction vessel fitted with a series of baffles and stirrer so that very intimate contact between the two reactant phases was maintained during its flow throughout the entire reaction zone. The size of the reaction vessel in relation to the combined pumping rates of the glycerine and fat in pounds per minute was such that its capacity was five times the normal pumping rate, thereby resulting in a normal hold-up time in the reactor of five minutes. By varying the pumping rates above and below this value, different hold-up times as shown in the tabulation and within the range disclosed elsewhere in this specification are obtained. The reaction vessel was fitted with a jacket through which hot Dowtherm liquid was circulated to prevent heat loss from the hot reaction mixture flowing therethrough. From the bottom of the reaction vessel the reaction product was introduced immediately into a continuous cooler wherein the temperature was quickly reduced to below 150° C., and from the cooler the reaction product was treated with sulfuric acid in amount sufficient to neutralize the catalyst and then passed into a conventional separating system for the separation and recovery of the monoester product.

The three runs marked "batch" in the foregoing tabulation were conducted for comparison purposes in order to show the advantages of the present invention in comparison with conventional prior art batch methods.

The data of the table show that the continuous operation provided by the present invention resulted in at least as good yields of the monoglyceride in the lower glycerine-to-fat ratios and in much superior yields of the monoglyceride at the higher glycerine-to-fat ratios, as contrasted to the results of batch processing. Furthermore, it will be noted that in the first two runs set forth above in which the monoglyceride yield by the batch method was nearly as good as that afforded by the present continuous method, the time for the latter of reaction or hold-up time was only 1/6 of that required by the batch method. The last two runs demonstrate that for a substantially lower glycerine-to-fat ratio, much higher yields are obtained for a hold-up time approximately 1/13 that of batch processing.

In addition to the advantages just mentioned, since the reaction mixture is maintained at relatively high temperatures for much shorter periods of time no appreciable darkening of the reaction product is encountered and consequently it is much easier to obtain good yields of a highly purified product suitable for edible purposes or the like with a minimum of refining.

While specific examples of preferred methods embodying the present invention have been set forth above, it will be apparent that many changes and modifications may be made in the methods of procedure without departing from the spirit of the invention. It will therefore be understood that the examples cited and the particular proportions and methods of operation set forth above

What is claimed is:

1. A continuous process of producing polyhydric alcohol esters of fatty acids having a high monoester content which comprises continuously passing a mixture of a polyester of a polyhydric alcohol and a polyhydric alcohol through a reaction zone maintained at a temperature from about 200° to about 350° C. while subjecting the mixture while flowing through said reaction zone to efficient agitation in order to promote intimate admixture of the reactants, regulating the rate of flow of said reaction mixture through said reaction zone so as to provide a hold-up time in said reaction zone not exceeding about 7 minutes but sufficient to reach substantial equilibrium, continuously withdrawing the reaction mixture from said reaction zone and immediately cooling said reaction mixture, thereby obtaining a reaction product rich in fatty acid monoesters of a polyhydric alcohol.

2. A process as defined in claim 1 in which the reaction is carried out in the presence of an alcoholysis catalyst.

3. A process as defined in claim 1 in which the reaction is carried out with a polyhydric alcohol/fatty ester molecular ratio of from about 2:1 to 10:1.

4. A continuous process for producing monoglycerides which comprises continuously and rapidly preheating a mixture of glycerine and fat in the ratio of about 2 to 10 mols of glycerine per mol of fat to a temperature of about 240° to 270° C., and in the presence of a relatively small quantity of an alkaline alcoholysis catalyst, thereafter continuously passing the preheated mixture into and through a jacketed reaction vessel in which the temperature is maintained within the aforesaid range and during which the reactants are repeatedly intensively agitated so as to bring about intimate contact between the reactant phases, regulating the rate of flow of said reaction mixture through said reaction vessel so as to provide a hold-up time of at most about 7 minutes therein but sufficient for the reaction to go substantially to equilibrium, continuously withdrawing the reaction mixture from the reaction vessel and immediately cooling said reaction mixture, thereby obtaining a reaction product high in monoglyceride content.

5. A process as defined in claim 4 in which the alcoholysis catalyst is sodium hydroxide.

6. A continuous process for converting triglycerides to monoglycerides that comprises continuously passing a mixture of said triglycerides and glycerine in a molecular ratio of from about 2 to 10 mols of glycerine per mol of triglyceride, said mixture also containing a small amount of sodium hydroxide as an alcoholysis catalyst, through a preheating zone in which the temperature of the mixture is rapidly raised to about 250° C., the rate of flow being such that the hold-up time in the preheating zone is approximately 1 minute, thereafter continuously passing the preheated mixture through a reaction zone in which it is violently agitated in order to effect intimate contact between the reactant phases and to bring about conversion of said triglycerides to monoglycerides, said reaction zone being heated in order to maintain the reaction mixture at a temperature of about 250° C., the rate of flow through said reaction zone being such that the hold-up time in said reaction zone is about 5 minutes, continuously withdrawing the reaction mixture from the reaction zone and thereafter immediately passing the reaction mixture into a cooling zone to rapidly cool said mixture and produce a reaction product high in monoglycerides content, and thereafter separating monoglycerides from said cooled reaction product.

7. A continuous process of producing polyhydric alcohol esters of fatty acids having a high monoester content which comprises continuously passing a mixture of a polyester of a polyhydric alcohol and a polyhydric alcohol downwardly through a vertical reaction zone maintained at a temperature from about 200° to about 350° C. while subjecting the mixture while flowing through said reaction zone to a series of mechanical agitations in order to promote intimate admixture of the reactants, regulating the rate of flow of said reaction mixture through said reaction zone so as to provide a sufficient hold-up time not exceeding about 7 minutes in said reaction zone for said reaction to go substantially to completion, continuously withdrawing the reaction mixture from the bottom of said reaction zone and immediately cooling said reaction mixture to a temperature below 150° C., thereby obtaining a reaction product rich in fatty acid monoesters of a polyhydric alcohol.

8. A process as defined in claim 7 in which the reaction is carried out in the presence of a relatively small amount of an alcoholysis catalyst.

9. A process as defined in claim 8 in which the reaction is carried out with a polyhydric alcohol/fatty ester molecular ratio of from about 2:1 to 10:1.

10. A continuous process for producing monoglycerides which comprises continuously preheating a mixture of glycerine and fat in the ratio of about 2 to 10 mols of glycerine per mol of fat to a temperature of about 240° to 270° C., and in the presence of a relatively small quantity of an alkaline alcoholysis catalyst, thereafter continuously passing the preheated mixture into and downwardly through a jacketed vertical reaction vessel in which the temperature is maintained within the aforesaid range and during which the reactants are repeatedly intensively agitated so as to bring about intimate contact between the reactant phases, said mixture remaining in the reaction vessel only long enough for the reaction to go substantially to completion and not to exceed about 7 minutes, continuously withdrawing the reaction mixture from the bottom of said reaction vessel and immediately cooling said reaction mixture to a temperature below 150° C., thereby obtaining a reaction product high in monoglyceride content.

11. A process as defined in claim 10 in which the alcoholysis catalyst is sodium hydroxide.

12. A continuous process for converting triglycerides to monoglycerides that comprises continuously passing a mixture of said triglycerides and glycerine in a molecular ratio of from about 2 to 10 mols of glycerine per mol of triglyceride, said mixture also containing a small amount of sodium hydroxide as an alcoholysis catalyst, through a preheating zone in which the temperature of the mixture is rapidly raised to about 250° C., the rate of flow being such that the hold-up time in the preheating zone is approximately 1 minute, thereafter continuously passing the preheated mixture downwardly through a vertical reaction zone in which it is repeatedly violently agitated in order to effect intimate contact between the reactant phases and to bring about conversion of said triglycerides to monoglycerides, said reaction zone being heated in order to maintain the reaction mixture at a temperature of about 250° C., the rate of flow through said reaction zone being such that the hold-up time in said reaction zone is about 5 minutes, continuously withdrawing the reaction mixture from the reaction zone and thereafter immediately passing the reaction mixture into a cooling zone to rapidly cool said mixture to a temperature below about 150° C. and produce a reaction product high in monoglyceride content, and thereafter separating monoglycerides from said cooled reaction product.

13. A continuous process of producing polyhydric alcohol esters of fatty acids having a high monoester content which comprises continuously passing a mixture of a polyester of a polyhydric alcohol and a polyhydric alcohol downwardly through an elongated vertically disposed reaction zone provided with a series of baffles and stirrers, and maintained at a temperature from about 200° to about 350° C., while subjecting the mixture while flowing through said reaction zone to a series of mechanical agitations in said reaction zone in order to promote intimate admixture of the reactants, regulating the rate of flow of said reaction mixture through said reaction zone so as to provide a hold-up time of from about 3 to 7 minutes in said reaction zone, continuously withdrawing the reaction mixture from the bottom of said reaction zone and immediately cooling said reaction mixture to a temperature below about 150° C., thereby obtaining a reaction product rich in fatty acid monoesters of a polyhydric alcohol.

References Cited in the file of this patent

UNITED STATES PATENTS

| | | |
|---|---|---|
| 2,496,328 | Bell | Feb. 7, 1950 |
| 2,634,278 | Kuhrt | Apr. 7, 1953 |